United States Patent [19]
Yoshikawa et al.

[11] Patent Number: 5,621,496
[45] Date of Patent: Apr. 15, 1997

[54] PHOTOPRINTING PROCESS AND DEVICE

[75] Inventors: Tohru Yoshikawa; Yoshiyuki Yamaji, both of Wakayama, Japan

[73] Assignee: Noritsu Koki Co., Ltd., Wakayama, Japan

[21] Appl. No.: 418,778

[22] Filed: Apr. 7, 1995

[30] Foreign Application Priority Data

Apr. 8, 1994 [JP] Japan .................................. 6-070681

[51] Int. Cl.$^6$ ............................ G03B 27/00; G03B 27/62
[52] U.S. Cl. ............................... 355/18; 355/50; 355/75; 355/77
[58] Field of Search .................. 355/18, 27–29, 355/35, 38, 40, 41, 50, 72, 75, 77; 354/19, 354, 298, 319–323; G03B 27/00, 27/62

[56] References Cited

U.S. PATENT DOCUMENTS

| | | | |
|---|---|---|---|
| 4,774,553 | 9/1988 | Blanding et al. | 355/75 |
| 4,835,574 | 5/1989 | Ohi | 355/27 |
| 4,888,613 | 12/1989 | Zangenfeind et al. | 355/41 |
| 5,093,686 | 3/1992 | Shigaki | 355/77 |
| 5,223,890 | 6/1993 | Sakakibara et al. | 355/75 |

FOREIGN PATENT DOCUMENTS 0423810  4/1991  European Pat. Off. ....... G03D 15/00

*Primary Examiner*—Arthur T. Grimley
*Assistant Examiner*—Herbert V. Kerner
*Attorney, Agent, or Firm*—Wenderoth, Lind & Ponack

[57] ABSTRACT

Both a web of film and film in a cartridge can be selectively processed for printing. A rotary table is provided on a common base with a scanner assembly and a printing/exposure unit provided on opposite sides of the rotary table in an opposed manner. A web of film is fed on film guides to pass the scanner assembly, rotary table and printing/exposure assembly in a straight manner. A film in cartridge is fed through a cartridge feed portion onto the rotary table.

2 Claims, 10 Drawing Sheets

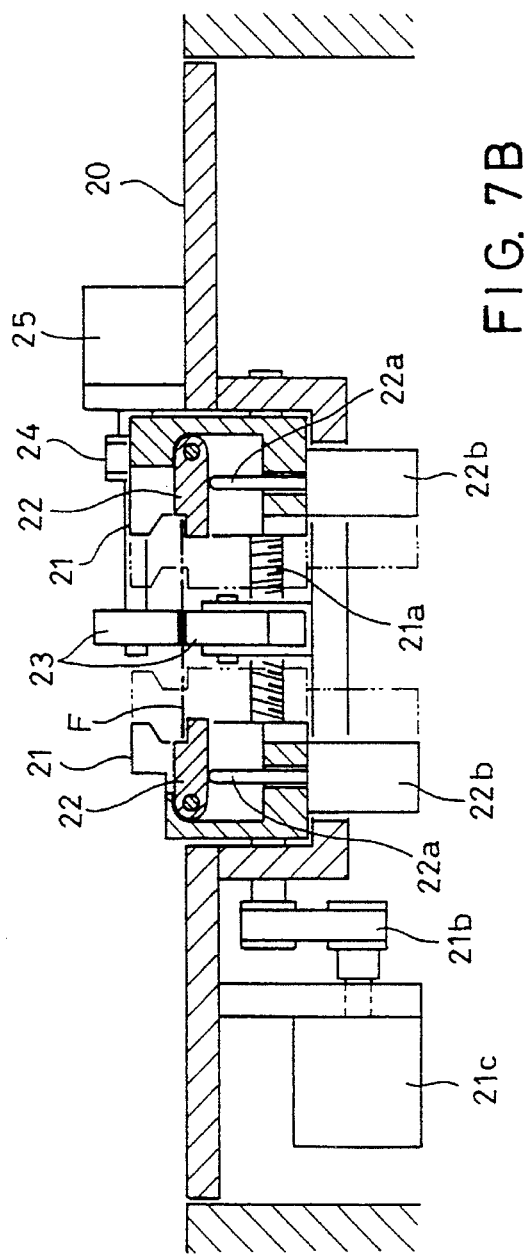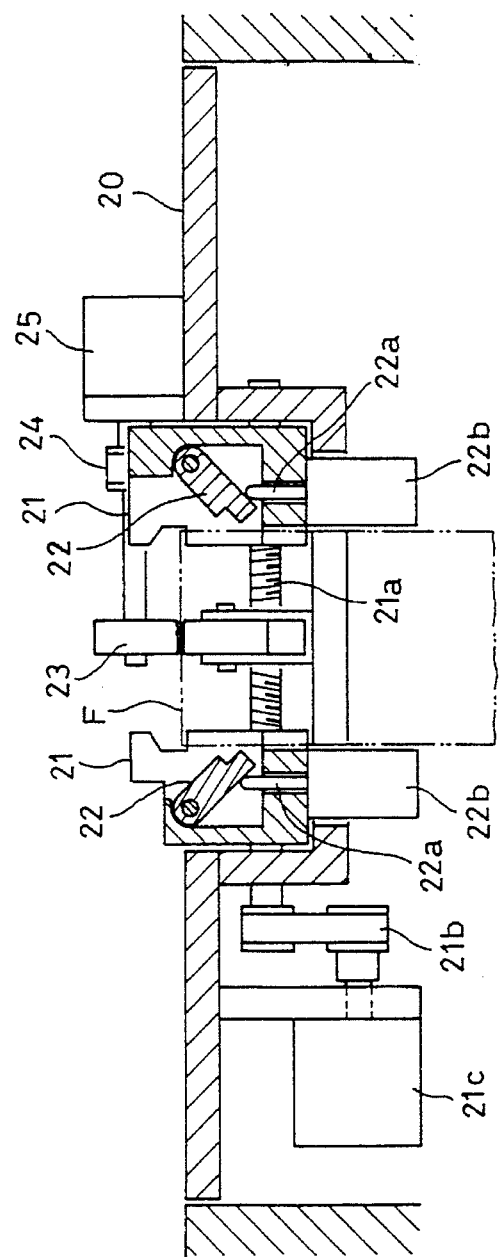

PHOTOPRINTING PROCESS AND DEVICE

BACKGROUND OF THE INVENTION

This invention relates to a photoprinting device which can print films housed in cartridges, a roll of spliced films, or strips of films detached from cartridges.

Ordinary conventional photoprinting devices have a scanner unit and a printing means that are arranged along a straight film feed path. The scanner unit optically reads printing data such as image density data from a film before printing. After adjusting the density of printing light based on the printing data by means of a light adjusting filter, such light is projected onto the film to print images on the film onto a photosensitive material.

The scanner unit has a separate light source for illuminating films, and a sensor for optically detecting image data such as image density data and sending such data to the printing/exposure means after converting such data to electric signals. The film is then sent to the printing/exposure means and is printed.

Heretofore, films were manually fed one by one into such conventional photoprinting/exposure device, or otherwise they were automatically fed into the printer through an inlet after splicing the ends of a plurality of films and winding them on a reel.

In such a conventional photoprinting device, the scanner unit reads image data of each film fed into the device. Based on the image data, the film is printed. Generally, it takes a much longer time to print films than to read image data of films such as image density data and to calculate printing adjustments based thereon.

Because of this difference in processing time, while one film is being printed, it is impossible to read image data of the next film. Also, while image data of one film is being read, it is impossible to print another film.

Thus, with these prior arrangements, it is impossible to process a plurality of films continuously with sufficient speed and efficiency. Also, films have to be cut apart from cartridges (patrones) and spliced or otherwise connected together before feeding them into the printer. Such operations are very time-consuming.

In order to solve these problems, a method and apparatus have been proposed for printing films which uses a rotary table, which can print films without cutting them apart from cartridges and in which image density and other data can be read in the scanner unit independently of the printing process in the printing/exposure means.

This rotary table type photoprinting/exposure device was, however, inconvenient because it cannot process rolls of films. A device which can process any of a film housed in a cartridge, a strip of film and a roll of films is desirable.

Photographic films are available in different widths. For example, there are 135 (35 mm) films and 110 films. Thus, a device which can process films of any size is desirable.

An object of this invention is to provide a method of printing films which can selectively print either films in strip or roll form or films housed in cartridges by feeding films through a single common feed path provided between the scanner unit and the printing/exposure unit.

Another object of this invention is to provide a device for carrying out the above method and which can process films of any size.

SUMMARY OF THE INVENTION

According to this invention, there is provided a method of printing films wherein one of the following two methods is carried out selectively according to the kind of films to be processed. The first method includes the steps of reading image data of a film in a scanner unit provided along a feed path of strips of films or rolls of films, adjusting the feed speed of films in a feed speed adjusting unit, and printing the image of the film onto a photosensitive material in a printing/exposure means, whereby reading of image data is carried out concurrently with the printing of films. The second method includes the steps of feeding a film housed in a cartridge from a circular feed path to one side of the feed path between the scanner unit and the printing/exposure means, feeding the film out of the cartridge, reading image data in the scanner unit, rewinding the film into the cartridge, feeding the cartridge along the circular feed path to the other side of the feed path, feeding the film out of the cartridge, printing the film in the printing/exposure means, and rewinding the film into the cartridge, whereby reading of image data is carried out concurrently with the printing of films.

Further according to the invention, there is provided a photoprinting device comprising a base on which various component parts are mounted, a rotary table rotatably mounted on the base, a scanner means and a printing/exposure means mounted on the base on diametrically opposite sides of the rotary table along a center line of the rotary table. At least a pair of cartridge holders and at least a pair of feed adjusting units are provided along the circumference of the rotary table. The cartridge holders and the feed adjusting units are arranged so as to be perpendicular to each other. Film winders are detachably mounted on one end of a film guide portion for guiding films through the scanner unit and one end of a film guide portion for guiding films through the printing/exposure means. The widths of the film guide portions, cartridge holders, and the feed adjusting units are adjustable according to the width of the films to be processed. The device is capable of selectively printing either films in strip or roll form or films housed in cartridges, of carrying out the process in the scanner means concurrently with the process in the printing/exposure means, and also of processing films of different sizes.

In the method of printing films according to this invention, strips of films or rolls of films are processed in a manner similar to a conventional method. Namely, after reading image data in a scanner unit and reading image density data and other data of each film in the scanner unit, the film is printed in a printing/exposure means by controlling printing based on the data obtained in the scanner unit. If the reading of image density and other data in the scanner unit is finished before the printing process, the film feed speed is adjusted in the feed adjusting unit provided between the scanner unit and the printing/exposure means. Thus, it is possible to read image data independently of and concurrently with the printing/exposure process.

When processing a film housed in a cartridge, image density data are read after unrolling the film from the cartridge and feeding it from the circular feed path into the common film feed path in the scanner unit. Then, the cartridge is fed along the circular path to the position opposite to the printing/exposure means. There, the film is again unrolled from the cartridge and printed. One of the abovementioned two methods is carried out selectively according to the kind of films to be processed.

With the photoprinting process according to the present invention, a single common scanner unit and a single common printing/exposure unit are used to process both strips or rolls of films and films housed in cartridges selectively. Thus, separate devices no longer are necessary for different types of films. This increases the efficiency and flexibility of processing.

With the photoprinting device according to the present invention, either strips of film fed from one end of the film guide or films in cartridges fed onto the rotary table can be processed selectively by use of a common scanner unit and a common printing/exposure unit.

The above method is carried out using the printing device according to the present invention. This device has width-adjustable film guides so that it can process films of any size.

Other features and objects of the present invention will become apparent from the following description made with reference to the accompanying drawings, in which:

BRIEF DESCRIPTION OF THE DRAWINGS

FIGS. 7A and 7B are sectional views taken along line VII—VII;

DETAILED DESCRIPTION OF PREFERRED EMBODIMENT

Figure 1:
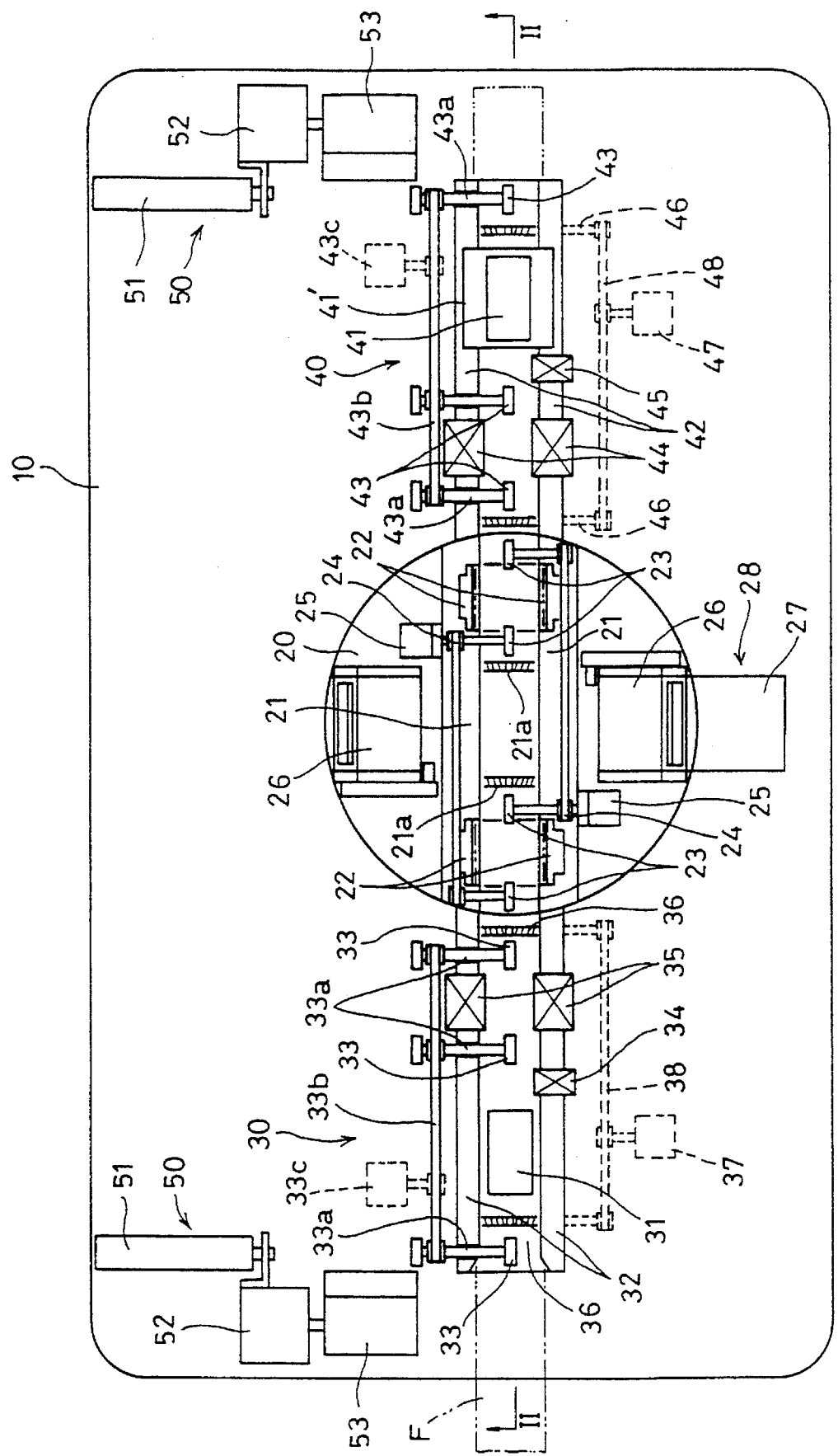
FIG. 1 is a plan view of a photoprinting device of an embodiment of the invention.

Referring now to the drawings, an embodiment of this invention is described.

Figure 2:
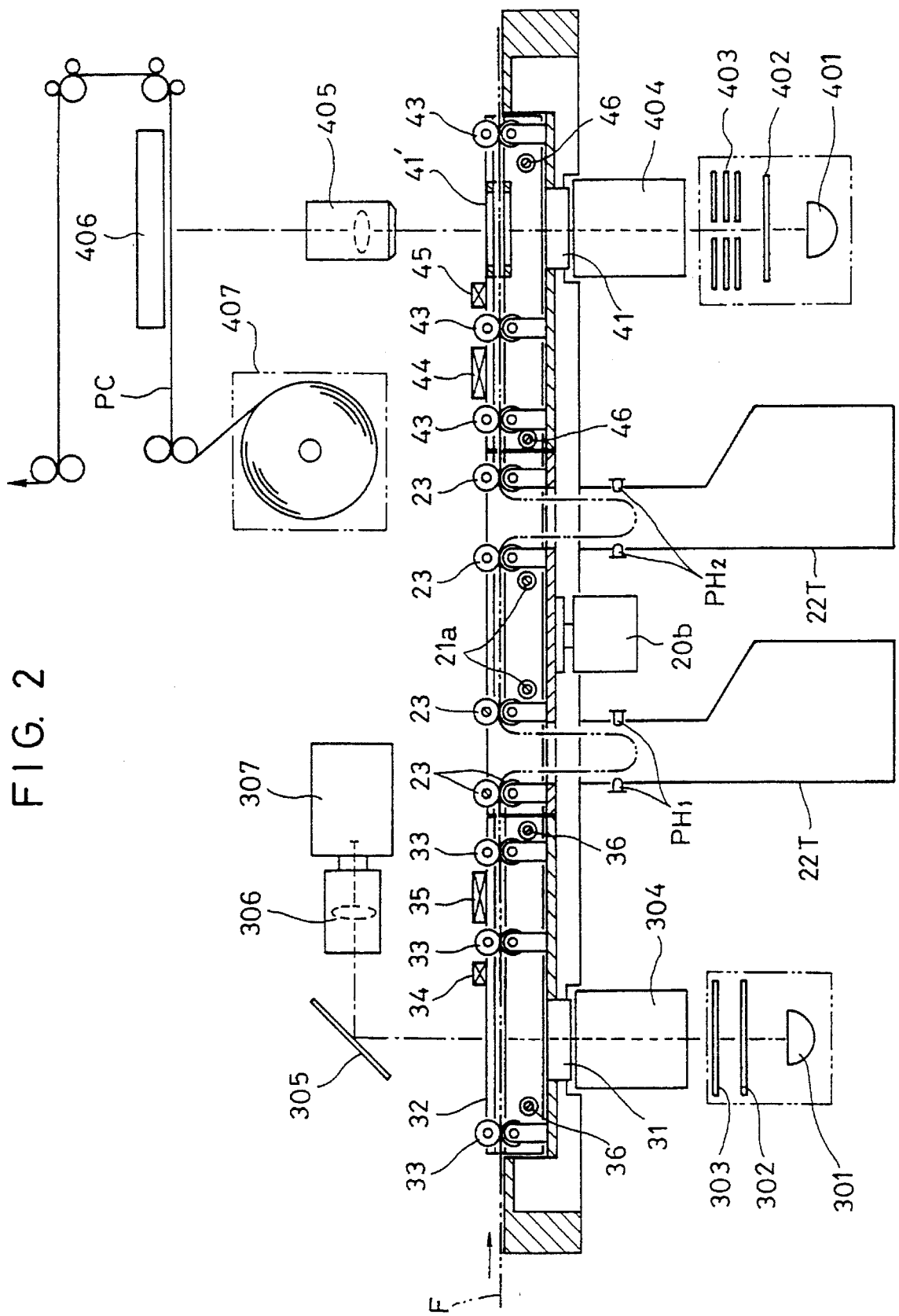
FIG. 2 is a partial sectional view taken along line II—II of FIG. 1.

FIG. 1 is a plan view of a photographic printing machine of such embodiment. FIG. 2 is a sectional view taken along line II—II of FIG. 1. The machine has the functions of processing both films in roll and strip forms and films housed in cartridges. FIGS. 1 and 2 show its function of processing strips of films. The function of processing films housed in cartridges will be described below.

A rotary table 20 is rotatably mounted on a common base 10 for supporting various members of the machine. Outside of the rotary table 20 and on diametrically opposite sides thereof, a scanner unit 30 and a printing/exposure unit 40 are mounted on the common base 10 along a longitudinal center line thereof.

Mounted on the rotary table 20 are film guides 21 that extend along a diametric line of the rotary table to feed films F from the scanner unit 30 to the printing/exposure unit 40. A pair of symmetrical loop guides 22 are provided at both ends of the film guides 21 along the circumference of the rotary table. At the front and rear of each loop guide 22 are feed rollers 23 for feeding films. The rollers 23 are driven by a drive unit including two mutually independent motors 25 and belts 24 to drive a two feed rollers 23 on the upstream sides of the loop guides 22 synchronously with each other, and also drive those on the downstream sides synchronously with each other.

Otherwise, all the four feed rollers 23 may be driven by four independent motors.

A pair of cartridge holders 26 are provided on the rotary table at both ends of its diameter extending perpendicular to a line connecting the loop guides 22. A cartridge feed portion 28 is provided on the common base 10 near one of the cartridge holders 26. At this portion, a slide table 27 receives a cartridge X. Its function will be described in detail later.

As shown in FIG. 2, the scanner unit 30 has a light source 301 provided under a scanner gate 31. Source 301 projects light through a filter 302, a shutter 303, a mirror tunnel 304 and the scanner gate 31 onto each frame of a film F. The light passing through the film, which carries image density data, is reflected by a reflecting mirror 305, passes through a lens 306 and is received by a scanner 307.

A film F is fed from the lefthand side of the figure, passed over the scanner unit 30, and is fed toward the rotary table 20 while being guided by film guides 32. Feed rollers 33 for feeding films F are provided along the film guides 32. A perforation detector 34 and a magnetic head 35 are provided along the film guides 32.

Threaded rods 36 are provided under front and rear ends of the film guides 32. The distance between the film guides 32 is adjustable by turning the threaded rods 36 by a motor 37 through a belt 38. The mechanism for adjusting the distance between the film guides will be described in more detail later.

The printing/exposure unit 40 is provided across the rotary table 20 from the scanner unit 30 along the line that passes centers of the rotary table 20 and the scanner unit 30. As shown in FIG. 2, the printing/exposure unit 40 has a print gate (opening) 41. Light from a light source 401 provided under the gate 41 is directed through a heat-absorbing filter 402, a light modulation filter 403, a mirror tunnel 404, the print gate 41, film guides 42, and a lens unit 405 to a paper mask 406, so that the images on the film are printed on a photosensitive material PC being fed into the paper mask 406 from a feeder 407.

Figure 3:
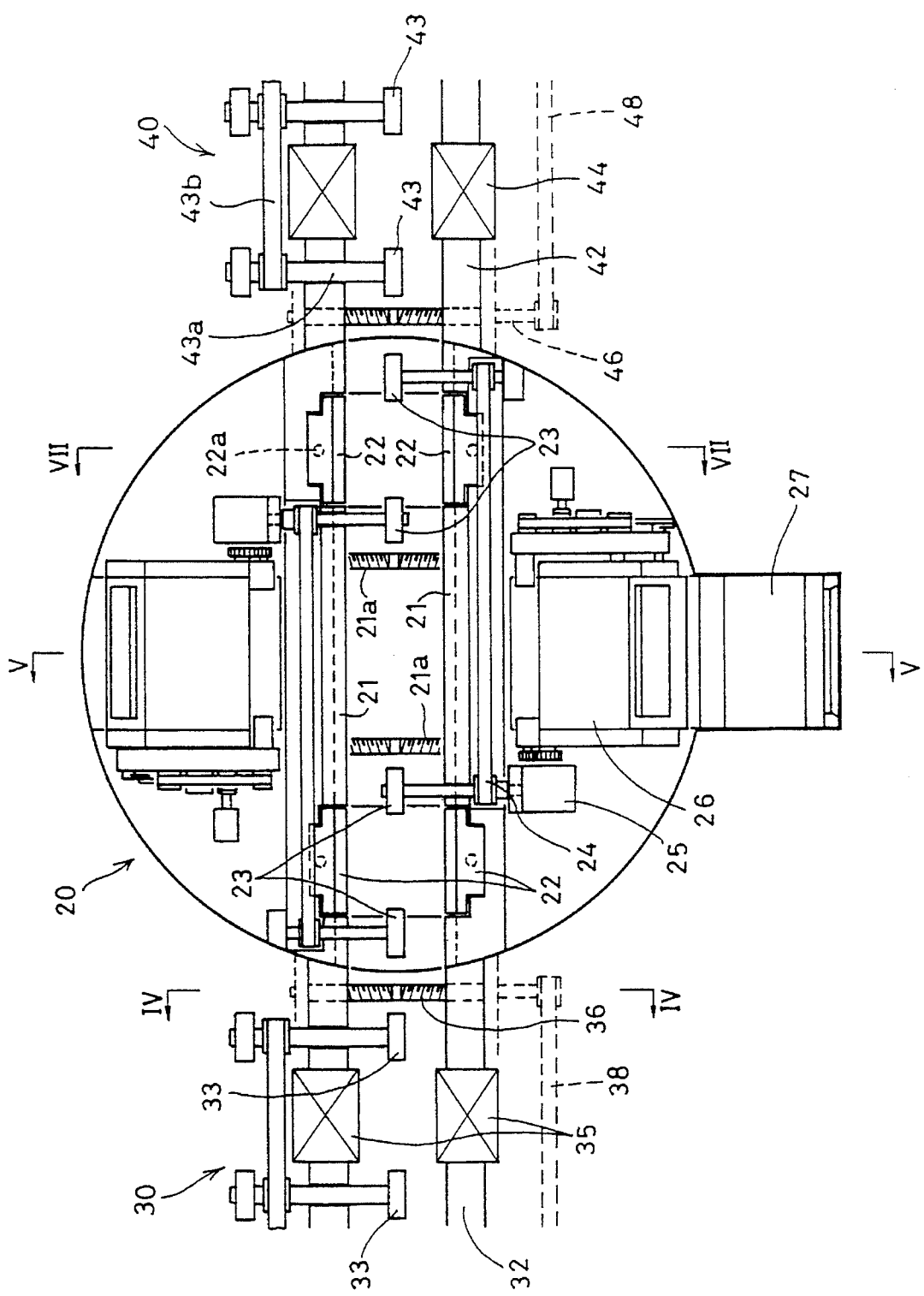
FIG. 3 is an enlarged plan view of the rotary table and its surrounding area.
Figure 4:
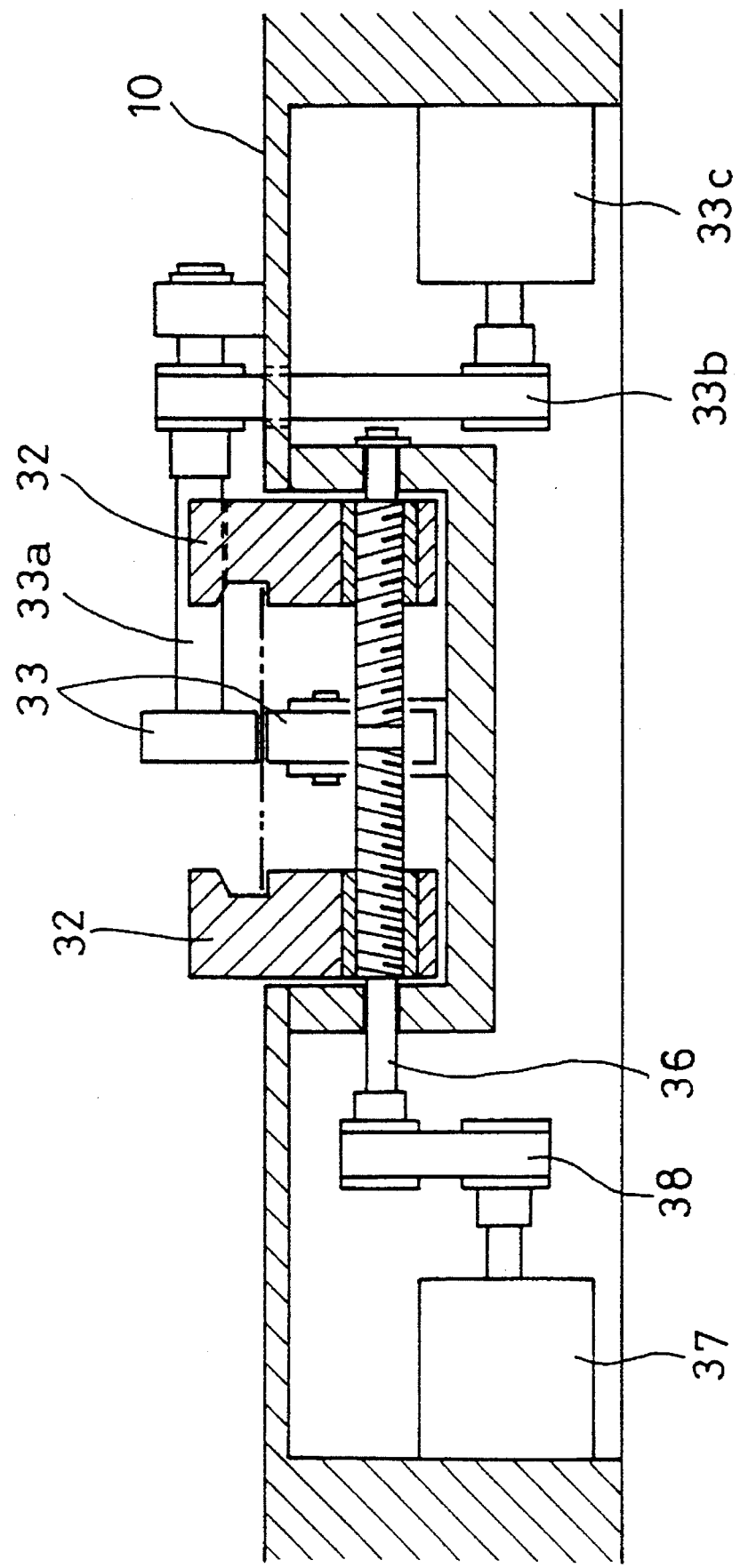
FIG. 4 is a sectional view taken along line IV—IV of FIG. 3.

FIG. 3 shows an enlarged plan view of the rotary table 20 and the surrounding area. Namely, part of the scanner unit 30 and part of the printing/exposure unit 40 are shown in this figure. FIG. 4 is a sectional view taken along line IV—IV of FIG. 3 and seen in the direction of arrows. As shown in FIG. 4, the threaded rods 36 for changing the distance between the film guides 32 have inversely threaded portions which are in threaded engagement with threaded holes formed in the right and left film guides 32, respectively. By turning the threaded rods, the distance between the film guides 32 is changed.

Each pair of feed rollers 33 are provided one on the other. One of each pair of rollers has a roller shaft 33a connected with a motor 33c through a belt 33b. Thus, by driving the motor 33c, the film F is fed sandwiched between the rollers.

Figure 5:
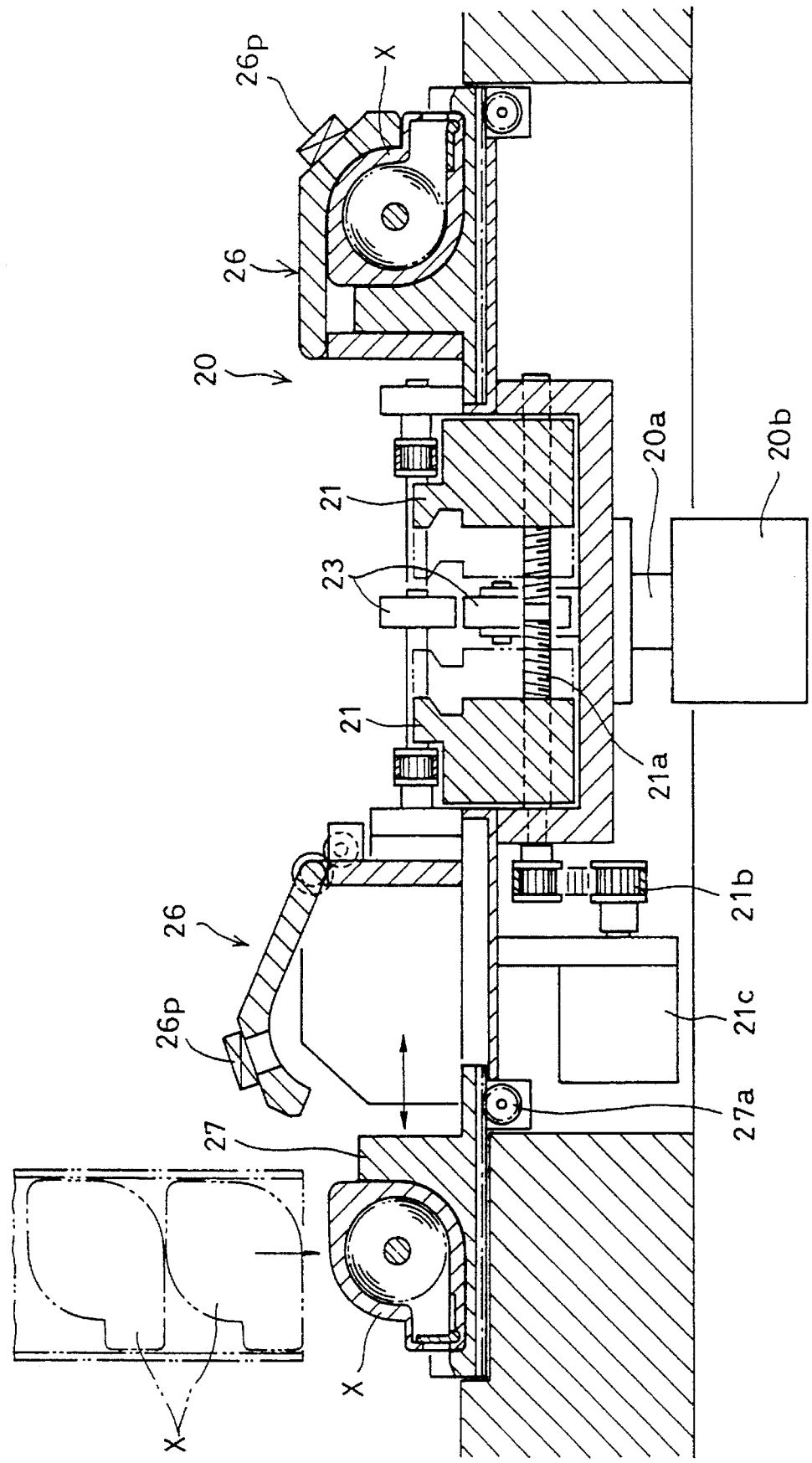
FIG. 5 is a sectional view taken along line V—V of FIG. 3.

FIG. 5 is a sectional view taken along line V—V of FIG. 3 and mainly shows a mechanism for feeding cartridges X containing films F onto the rotary table 20. As shown, a large, shallow recess having a rectangular section is formed in the central portion of the rotary table 20. Film guides 21 are mounted in this recess. The distance between the film guides 21 is adjustable in the same manner as with the film guides 32.

Namely, threaded rods 21a are in threaded engagement with the film guides 21. Each threaded rod 21a is drivingly connected to a motor 21c through a belt 21b and has inversely threaded portions. By rotating the rods 21a with the motor 21c, the distance between the film guides 21 can be changed freely.

Under the center of the rotary table 20 is a driving unit for rotating the rotary table 20 by a motor 20b through a rotary shaft 20a.

A pair of cartridge holders 26 are provided on the rotary table 20 at both ends of its diameter extending perpendicular to the line connecting the loop guides 22 provided at both ends of the film guides 21. A slide table 27 is provided on the common plate 10 at a position opposite to each cartridge holder 26 (see FIG. 3). When a cartridge X is placed on the slide table 27, it moves toward the rotary table 20 to feed the cartridge X into the cartridge holder 26 (FIG. 5).

The slide table 27 has a rack on the bottom. By rotating a pinion 27a that meshes with the rack by an unillustrated driving unit, the slide table 27 can be moved onto or away from the rotary table 20.

Figure 6:
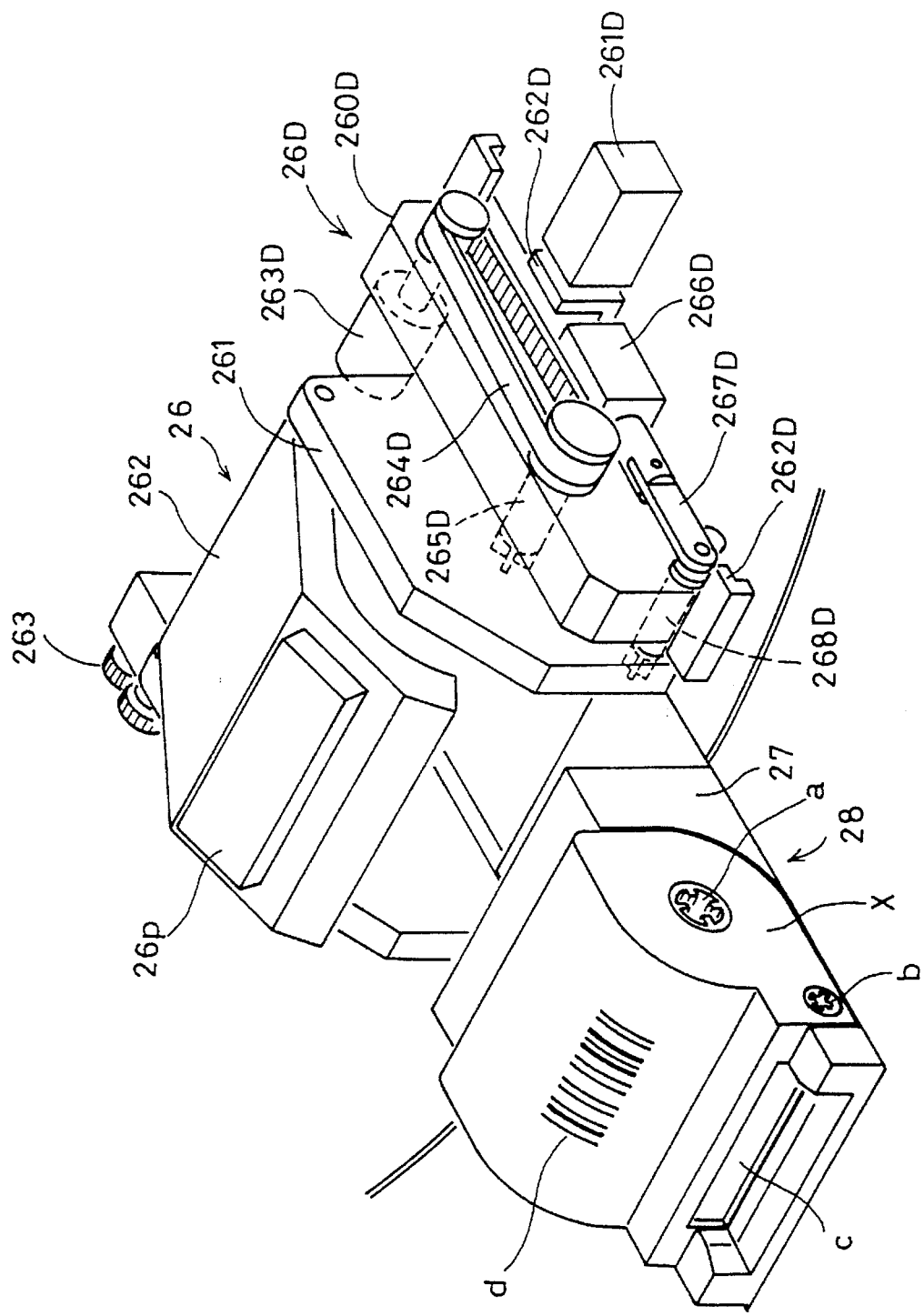
FIG. 6 is an enlarged perspective view of a cartridge holders and its surrounding area.

FIG. 6 is a perspective view of one of the cartridge holders 26 and the slide table 27, which is now loaded with a cartridge X. The cartridge holder 26 is a box comprising side walls 261 and an openable lid plate 262. The lid plate 262 is opened and closed with a small motor (not shown) through gears 263 in the illustrated embodiment, but it may be opened and closed in a different way. Numeral 26p indicates a bar code detector.

The cartridge holder 26 has a driving unit 26D for winding and unwinding the film F in the cartridge X set in the cartridge holder 26. The driving unit 26D can be moved into contact with and away from the cartridge holder 26 by moving a casing 260D of the driving unit with e.g. an air cylinder 261D.

The driving unit 26D has a motor 263D drivingly connected with a rotary shaft 265D through a belt 264D, and a solenoid 266D drivingly connected with a rotary shaft 268D through a link bar 267D. The rotary shafts 265D and 268D are positioned so that when the driving unit 26D is brought into contact with the cartridge holder 26, their ends protrude through the side wall 261 into the holder and engage holes of the cartridge X set in the holder.

When the slide table 27 is on the cartridge feed portion 28 on the common table 10, a cartridge X is manually placed on the slide table 27 or supplied from a feed device, as shown by dotted lines in FIG. 5. The cartridge X shown has the shape of a snail shell, but it may have a different shape. The cartridge shown in FIG. 6 has a core around which a film is wound, and a shaft for opening a light shield lid c. The core and shaft are formed with holes a and b in their end faces on the same side. A bar code d is printed on the outer surface of the cartridge X.

FIGS. 7A and 7B are sections taken along line VII—VII of FIG. 3. They show mainly the sectional shape of the loop guides 22 provided at both ends of the film guides 21. FIG. 7A shows their inoperative state, and FIG. 7B shows their operative state wherein the film F is sagging, forming a loop. As shown in the figures, the loop guides 22 are received in cutouts formed in the film guides 21. The loop guides 22 are moved between the operative and inoperative positions by vertically moving solenoid pins 22a provided under the loop guides 22 with solenoids 22b.

As shown in FIG. 2, loop tanks 22T are provided under the respective loop guides 22 to receive looped portions of the film. The loop tanks 22T have photoelectric sensors PH1 and PH2 to measure the size of loops.

As shown in FIG. 1, the printing/exposure unit 40 has distance-adjustable film guides 42 similar to those provided in the scanner unit 30. Provided along the film guides 42 are feed rollers 43, magnetic heads 44, and a perforation detector 45. Also, similar to the scanner unit 30, the unit 40 has threaded rods 46, a motor 47 and a belt 48 for adjusting the distance between the film guides 42. Each feed roller 43 is carried by a roller shaft 43a. The driving force of a motor 43c is transmitted to the rollers 43 through a belt 43b and the roller shafts 43a.

Figure 8:
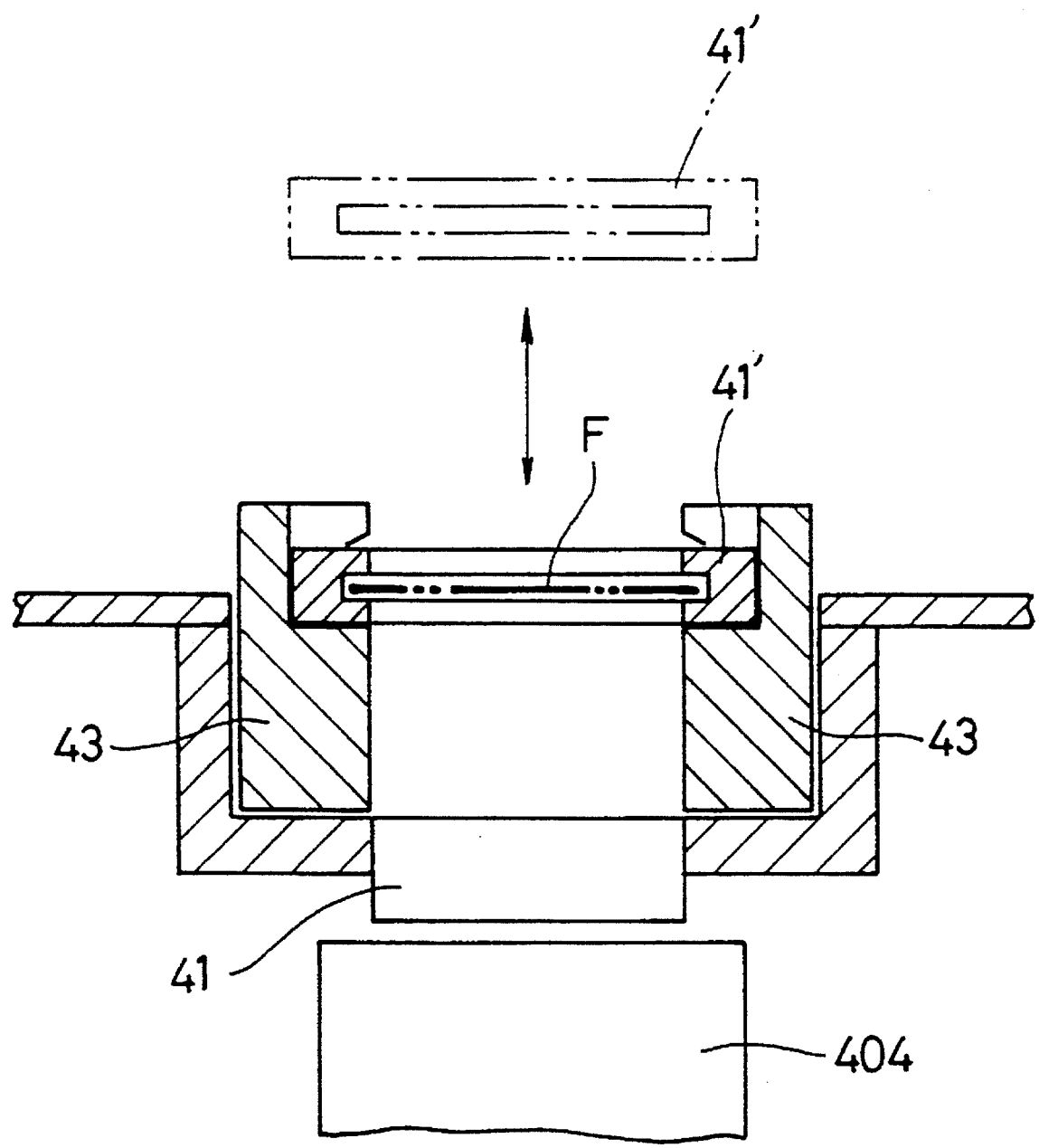
FIG. 8 is a sectional view of a film mask when it is located over a print gate.

As shown in FIG. 8, a film mask 41' is provided over the print gate 41. If the film size is changed, mask 41' is exchanged for a new one having an opening of a size corresponding to the film size.

FIG. 1 also shows film winding units 50 provided on opposite ends of the common table 10. Each unit 50 comprises a cylinder 51, a motor 52 and a winder 53. Though not shown, the motor 52 and the winder 53 are mounted on a common plate which is adapted to be moved in the direction perpendicular to the film guides 32, 42 by a guide member.

Figure 9:
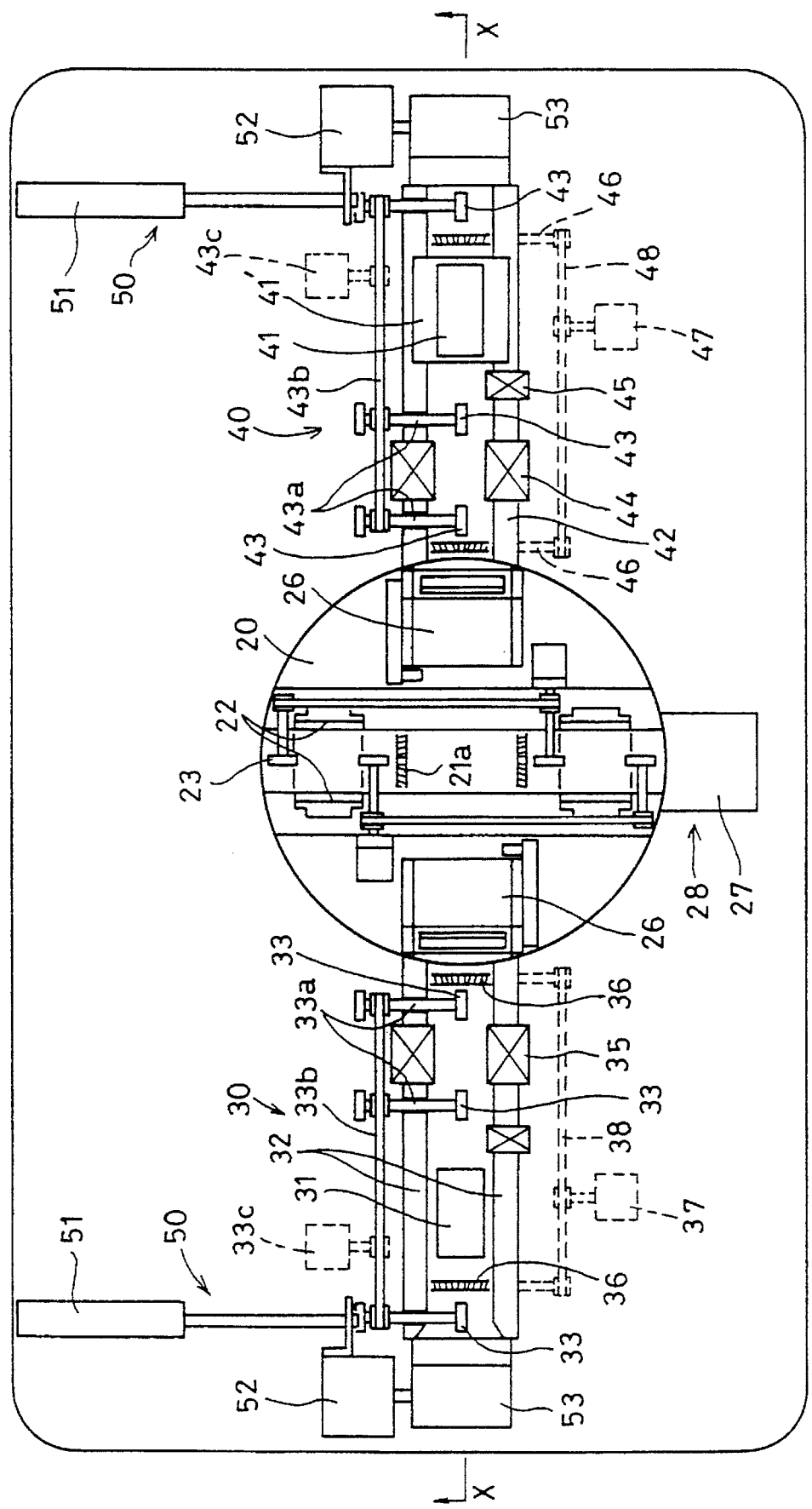
FIG. 9 is a plan view showing how films housed in cartridges are processed.

The winders 53 are used to process films in cartridges. In FIG. 9, as we will describe later, winders 53 are moved to positions corresponding to the film guides 32 and 42. When processing strips of films, winders 53 are retracted to the positions shown in FIG. 1.

The operation of the photoprinting device of this embodiment when processing strips of films and films in cartridges will be described. This device can also process a plurality of strips of films that are spliced together. In the description of the structure of the device, the operation of the individual parts or units is described. The operation of the photoprinting device as a whole now will be described.

Before printing films, the rotary table 20 has to be turned to a predetermined position according to whether the films to be processed are in the form of strips or individually housed in cartridges. For example, if strips of films are to be processed, the position of the table 20 is set as shown in FIG. 1.

As shown in FIG. 1, if this device is used to process a strip of film, the leading end of the film F is inserted into the film guides 32. The film is fed by the feed rollers 33 while stopping intermittently every time one of its frames is positioned right over the scanner gate 31, to enable density data on each frame to be read by the scanner 307.

After reading the density data, the film F is further fed by the feed rollers 33 to the perforation detectors 34, where the image positions are detected, and the magnetic head 35, where magnetic data of the film are detected. The film F is then fed through the film guides 21 on the rotary table 20 into the printing/exposure unit 40.

In the printing/exposure unit 40, the film F is fed by the feed rollers 43. The magnetic data are again read by the magnetic head 44 and compared with the data read by the head 35 to determine if the frame to be printed is the right one. Also, the frame position is verified again by the perforation detector 45. The film is stopped when the predetermined frame comes right over the print gate 41.

The predetermined frame is then printed by exposure. This printing/exposure process is a conventional process, so that its further description is omitted. The film is fed intermittently through the printing/exposure unit 40 to print the frames one after another. When one film has been printed or one lot of printing is finishes, the strip of film is pulled out from the righthand side of the common table 10 in FIG. 1.

It takes a far longer time to print each frame of a film in the printing/exposure unit than to read image density data from each frame in the scanner unit 30. Thus, without some kind of processing speed adjusting means, reading of image density data has to be stopped while printing films in the printing/exposure unit. In this embodiment, these two steps are carried out independently.

There is provided a processing speed adjusting means comprising the loop guides 22 provided on the rotary table 20 and the loop tanks 22T shown in FIG. 2. Such means serves to absorb any difference between the processing speeds in the scanner unit 30 and the printing/exposure unit.

If it is necessary to sag a film F to adjust such difference in processing speeds, the loop guides 22 are activated as shown in FIG. 7B to prevent the film F from being fed forward. Instead, the film F sags into the loop tanks 22T. The length of sagging is always detected by the photoelectric sensors PH1 and PH2.

Typical films have a width of 35 mm (size 135), but there are various films having different widths such as size 110. The device of this embodiment can process any film having a width of up to the width of 135 film. For this purpose, the film guides 32, 21 and 42 are all distance-adjustable.

Every time the film size is changed, the distance between each pair of the film guides 32, 21 and 42 is changed by turning the threaded rods 36, 21a and 46 by means of the motors 37, 21c and 47. Also, the film mask 41' in the printing/exposure unit 40 is exchanged for one having an opening of a width corresponding to the width of the film.

Figure 10:
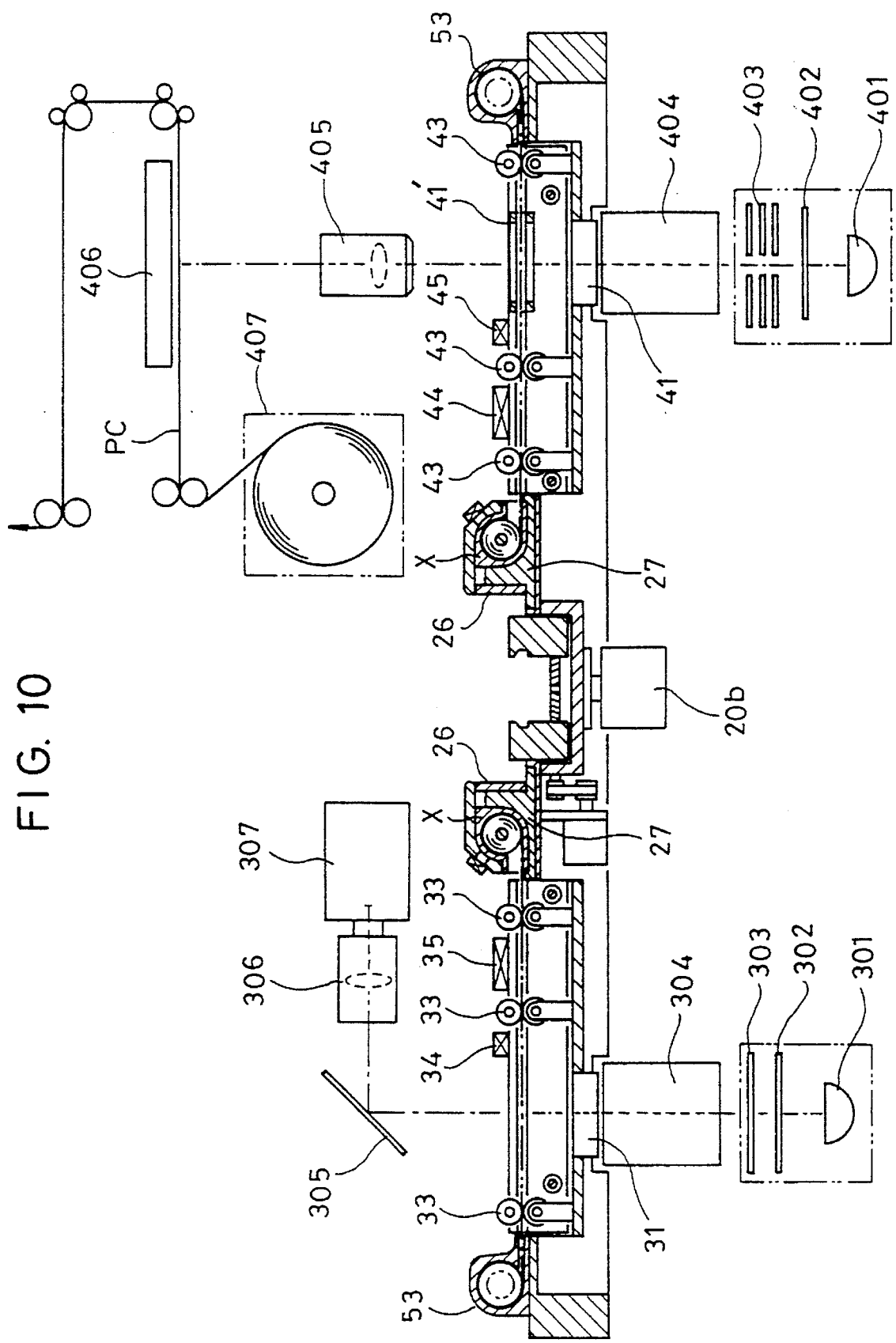
FIG. 10 is a sectional view taken along line X—X of FIG. 9.

FIGS. 9 and 10 show the operation when processing a film housed in a cartridge.

A cartridge X is supplied into one of the cartridge holders 26 on the rotary table 20 by means of the slide table 27. While not in use, the slide tables 27 are put away in the respective cartridge holders 26 as shown in FIG. 5. To supply a cartridge X into one holder 26, the pinion 27a is rotated by a motor to push the slide table 27 into the cartridge feed portion 28, the cartridge X is put on the table 27, and the table is pushed into the cartridge holder 26.

In this state, the rotary table 20 is turned clockwise by 90° to the position shown in FIG. 9, where the cartridge X is brought opposite to the scanner unit 30. In this state, the solenoid 266D (FIG. 6) is activated with the rotary shaft 268D engaged in the hole b to open the light shielding lid c of the cartridge X by turning its shaft. Then, the motor 263D is activated with the rotary shaft 265D engaged in the hole a to turn the core and unwind the film F.

The film F is fed through the film guides 32 in the direction opposite to the direction in which strips of films are fed. The magnetic head 35 detects its magnetic data, and the perforation detector 34 detects the frame positions. Then, the film is stopped when each frame comes just over the scanner gate 31 to read the image density data.

When the film F is fed by the feed rollers 33 until its leading end reaches the left end of FIG. 9, the film is wound into the winder 53 provided at this end by the motor 52. But the entire length of the film is not rolled out of the cartridge X. Rather, after reading image density data of the last frame of the film, it is rewound into the cartridge X by reversing the motors 52 and 263D.

When the film F has been rewound into the cartridge X after reading its image density data, the rotary table 20 is turned clockwise by 180° from the position shown in FIG. 9 to move the cartridge X to the position opposite to the printing/exposure unit 40.

In this position, the film F is again rolled out of the cartridge X in the same way as when feeding the film into the scanner unit 30, and is fed by the feed rollers 43 through the film guides 42. After verifying each frame with the magnetic head 44 and the perforation detector 45, the film is exposed and printed in the printing/exposure unit 40 in the same manner as with strips of films.

The leading end of the film F is wound into the winder 53 provided at the right end of FIG. 9 while being printed. When all the frames are printed, the film is rewound into the cartridge X.

In this embodiment, two cartridge holders 26 are provided on the rotary table 20. When turning the rotary table 20 to move the cartridge X set in one of the cartridge holders 26 from the position opposite to the scanner unit 30 to the position opposite to the printing/exposure unit 40, table 20 is stopped at the position where the other empty cartridge holder 26 is located opposite to the cartridge feed portion 28. At this position, a second cartridge X is set in the empty holder 26. Then, the rotary table is turned to move the first and second cartridges X to the positions opposite to the printing/exposure unit 40 and the scanner unit 30, respectively.

The rotary table 20 is then turned again to move the first cartridge X to the cartridge feed portion 28 to eject the first cartridge. The cartridge is ejected manually in this embodiment, but it may be ejected automatically by providing an automatic ejector. After ejecting the first cartridge X, a third cartridge X is placed on the slide table 27 and processed in the same manner as with the first and second cartridges X.

Films housed in cartridges also come in various widths such as 135 and 110 sizes. The distance between film guides are thus adjusted according to the width of the film to be processed. In this case, however, there is no need to adjust the distance between the film guides 21 on the rotary table 20.

In the above embodiment, cartridges X are moved along a circumferential path by turning the rotary table 20. But instead of using such a rotary table, cartridge holders 26 may be moved on a circular rail.

What is claimed is:

1. A method of printing films wherein one of the following two methods is carried out selectively according to the kind of films to be processed: the first method comprising the steps of reading image data of a film in a scanner unit provided along a feed path of strips of films or rolls of films, adjusting the feed speed of films in a feed speed adjusting unit, and printing the image of said film onto a photosensitive material in a printing/exposure means, whereby reading of image data is carried out concurrently with the printing of films; and a second method comprising the steps of feeding a film housed in a cartridge from a circular feed path to one side of said feed path between said scanner unit and said printing/exposure means, feeding the film out of the cartridge, reading image data in said scanner unit, rewinding the film into the cartridge, feeding the cartridge along said circular feed path to the other side of said feed path, feeding the film out of the cartridge, printing the film in said printing/exposure means, and rewinding the film into the cartridge, whereby reading of image data is carried out concurrently with the printing of films.

2. A photoprinting device comprising a base on which various component parts are mounted, a rotary table rotatably mounted on said base, a scanner means and a printing/exposure means mounted on said base on diametrically opposite sides of said rotary table along a center line of said rotary table, at least a pair of cartridge holders and at least a pair of feed adjusting units provided along the circumference of said rotary table, said cartridge holders and said feed adjusting units being arranged so as to be perpendicular to each other, and film winders detachably mounted on one end of a film guide portion for guiding films through said scanner unit and one end of a film guide portion for guiding films through said printing/exposure means, the widths of said film guide portions, said cartridge holders, and said feed adjusting units being adjustable according to the width of the films to be processed, whereby said device is capable of selectively printing either films in strip or roll form or films housed in cartridges, of carrying out the process in said scanner means concurrently with the process in said printing/exposure means, and also of processing films of different sizes.

* * * * *